United States Patent
Hsu

(10) Patent No.: US 6,405,451 B1
(45) Date of Patent: Jun. 18, 2002

(54) LOCK MECHANISM OF TAPE MEASURE

(76) Inventor: Cheng-Hui Hsu, No. 126-128, Pao Chung Rd., Hsin-Tien, Taipei Hsien (TW)

( * ) Notice: Subject to any disclaimer, the term of this patent is extended or adjusted under 35 U.S.C. 154(b) by 0 days.

(21) Appl. No.: 09/709,468

(22) Filed: Nov. 13, 2000

(51) Int. Cl.$^7$ ................................................ G01B 3/10
(52) U.S. Cl. ........................................... 33/767; 33/761
(58) Field of Search ..................... 33/755, 761, 759, 33/767, 769, 756, 764, 766, 768

(56) References Cited

U.S. PATENT DOCUMENTS

| | | | | |
|---|---|---|---|---|
| 2,575,354 A | * | 11/1951 | Mills | 33/767 |
| 3,164,907 A | * | 1/1965 | Quenot | 33/767 |
| 4,131,244 A | * | 12/1978 | Quenot | 33/767 |
| 4,153,996 A | * | 5/1979 | Rutty | 33/767 |
| 4,288,923 A | * | 9/1981 | Duda | 33/767 |
| 4,998,356 A | * | 3/1991 | Chapin | 33/767 |
| 5,007,178 A | * | 4/1991 | Dewire et al. | 33/767 |
| 5,367,785 A | * | 11/1994 | Benarroch | 33/767 |
| 5,657,551 A | * | 8/1997 | Lin | 33/767 |
| 6,026,585 A | * | 2/2000 | Li | 33/767 |
| 6,032,380 A | * | 3/2000 | Li | 33/767 |
| 6,256,901 B1 | * | 7/2001 | Lin | 33/767 |

\* cited by examiner

Primary Examiner—Diego Gutierrez
Assistant Examiner—Mirellys Jagan
(74) Attorney, Agent, or Firm—Bacon & Thomas, PLLC

(57) ABSTRACT

A tape measure. The tape measure includes a lock device at a bottom opening, an engagement device, and an abutment device. To pull or rewind tape, the front end of control device is pressed to cause both the lock device and the engagement device to pivot upwards, thus allowing tape to be pulled or rewound freely. When the lock device is released, this causes both the lock device and engagement device to pivot in a reverse direction for locking tape. The locking/unlocking of tape is effected in an up-and-down movement of the front end of the lock device.

3 Claims, 5 Drawing Sheets

LOCK MECHANISM OF TAPE MEASURE

FIELD OF THE INVENTION

The present invention relates to measuring devices and particularly to a lock mechanism of tape measure with improved characteristics.

BACKGROUND OF THE INVENTION

A conventional tape measure is shown in FIG. 1 wherein the lock mechanism is implemented as below. A sliding block 12 is provided at a recess 111 in the rear of opening 11a. A flexible member 121 is formed at the front end of sliding block 12. In operation, push the sliding block 12 forward to cause flexible member 121 to move up along the engaged slope 112 for biasing against and locking tape A after tape A has been pulled out of the tape measure a desired length. Also, a cushion B is provided at the front of opening 11a for absorbing the impact of the rewinding tape A, thus protecting the tape measure.

Above tape measure is advantageous for being portable, compact, and easy operation. Thus it has been widely used in families, tailoring, and short distance measuring applications. However, user may feel laborious in locking a large tape measure incorporating above lock mechanism. This is because the length of tape is longer, the width of tape is wider, the weight of tape is heavier, and the force of the rewinding tape is much stronger. As such, simply push the sliding block 12 to cause flexible member 121 to bias against and lock tape A is not sufficient. That is why user may feel laborious in locking such large tape measure. In analyzing the cause of laboriousness, it is found that the direction of pushing the sliding block 12 to lock the tape A is opposite to that of the rewinding tape A. In other words, user has to exert a force strong enough to stop the motion of the rewinding tape for locking the tape. Further, the rewinding force of the tape of a larger tape measure is relatively strong.

SUMMARY OF THE INVENTION

It is an object of the present invention to provide a lock mechanism of tape measure comprising a case including a predetermined length of tape, a front tape opening, a bottom opening, a first and third pins at the proximal end of the tape opening, and a second pin distally from the tape opening; a lock means at the bottom opening, the lock means including a pair of rear holes with the second pin passed through and a pair of front holes; an engagement means including a planar member, an aperture in the rear of the planar member with the first pin passed through, an engagement member extended down from the aperture, a post on the planar member, and two studs on the opposite sides of the planar member received in the front holes of the lock means; and an abutment means put on the third pin above the planar member, the abutment means including an abutment member at the bottom and a spring put on the post being engaged with the abutment member. In pulling or rewinding tape, simply press the front end of control means to cause lock means to pivot upward about second pin for causing engagement means to pivot upward about first pin. At this time, spring is compressed and engagement member becomes disengaged from tape, thus allowing tape to pull or rewind freely. To the contrary, release lock means to cause both lock means and engagement means to pivot in a reverse direction by the expansion of spring until the contact member is biased against for locking tape. The locking/unlocking of tape is effected in an up-and-down movement of the front end of lock means as opposed to the transverse movement of prior art.

The above and other objects, features and advantages of the present invention will become apparent from the following detailed description taken with the accompanying drawings.

DETAILED DESCRIPTION OF THE PREFERRED EMBODIMENTS

Figure 1:
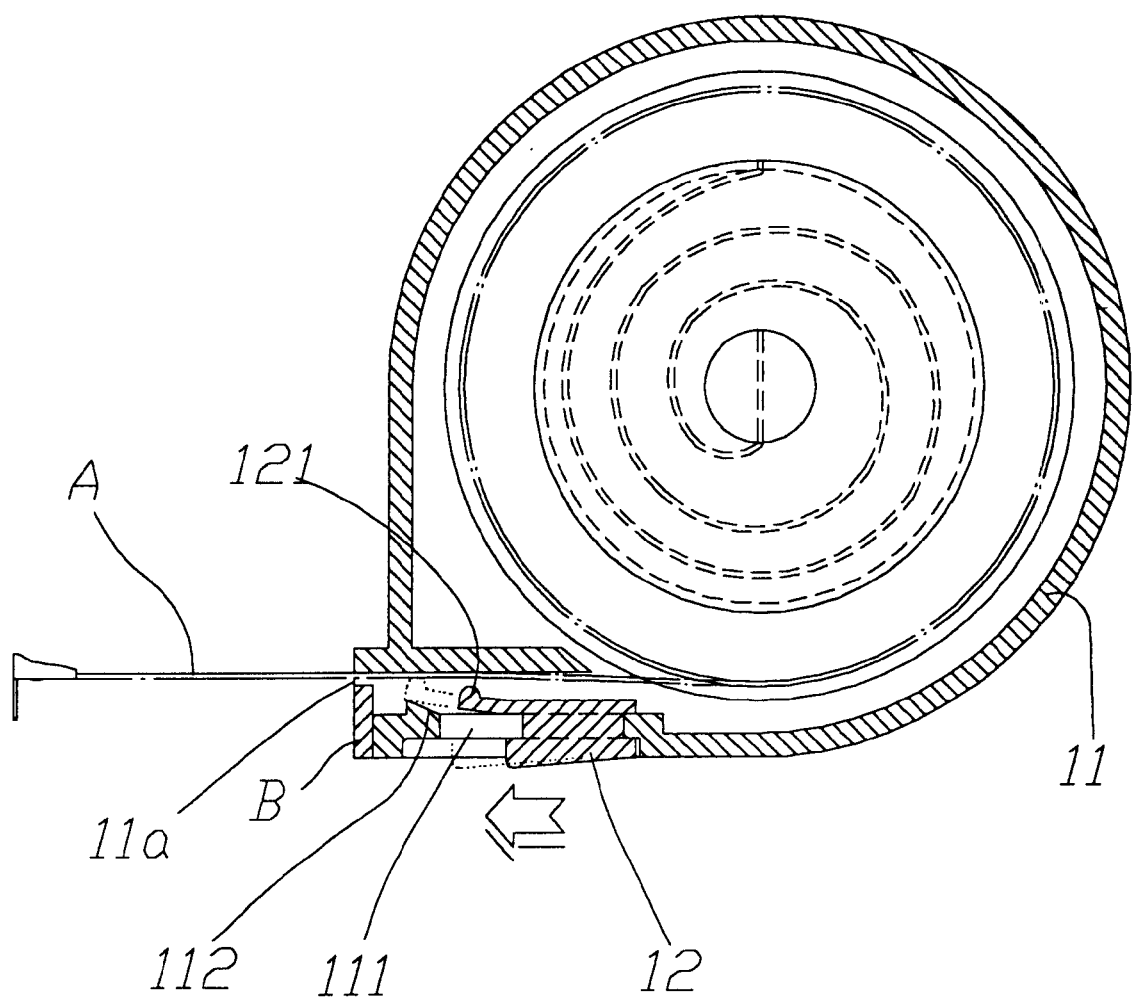
FIG. 1 is a cross-sectional view of a conventional tape measure.
Figure 2:
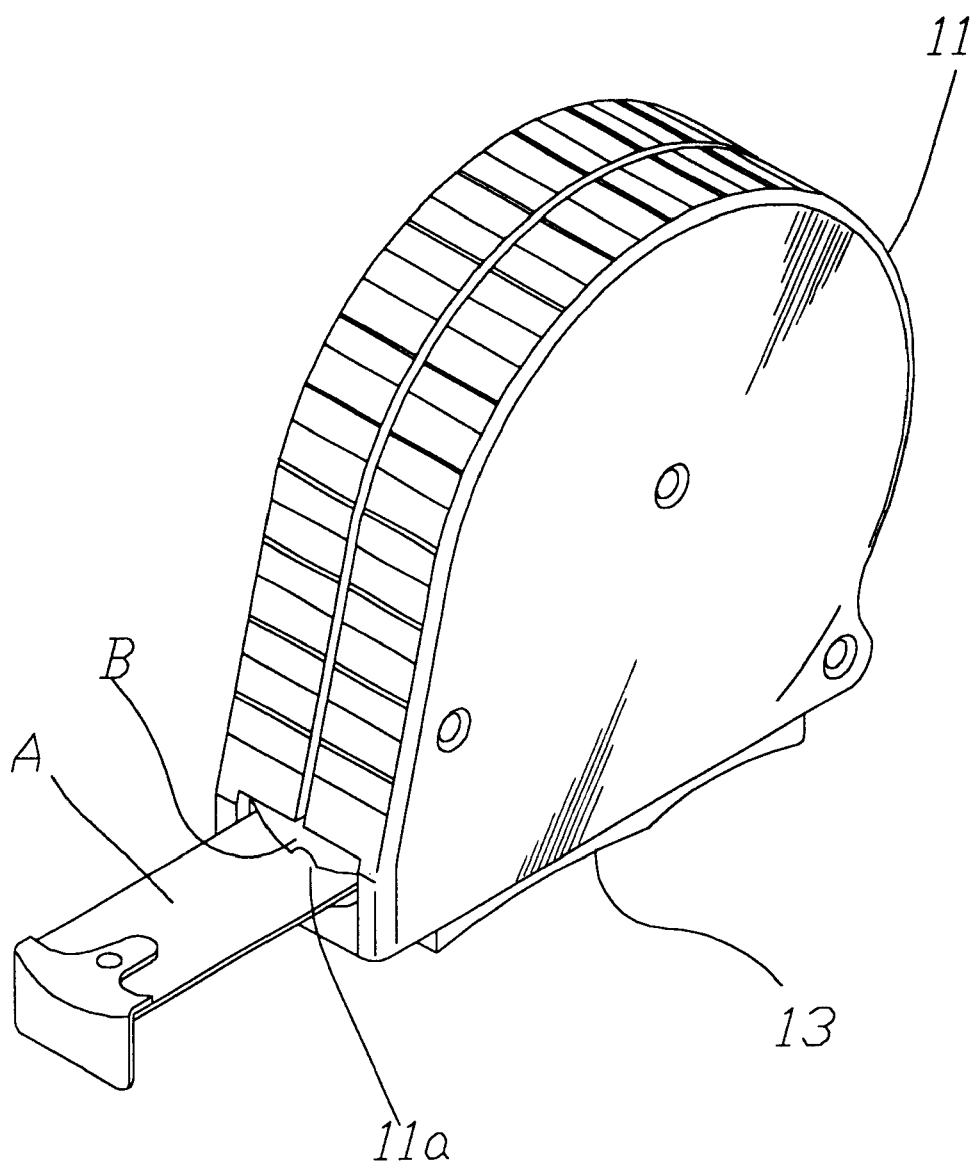
FIG. 2 is a perspective view of a tape measure according to the invention.
Figure 3:
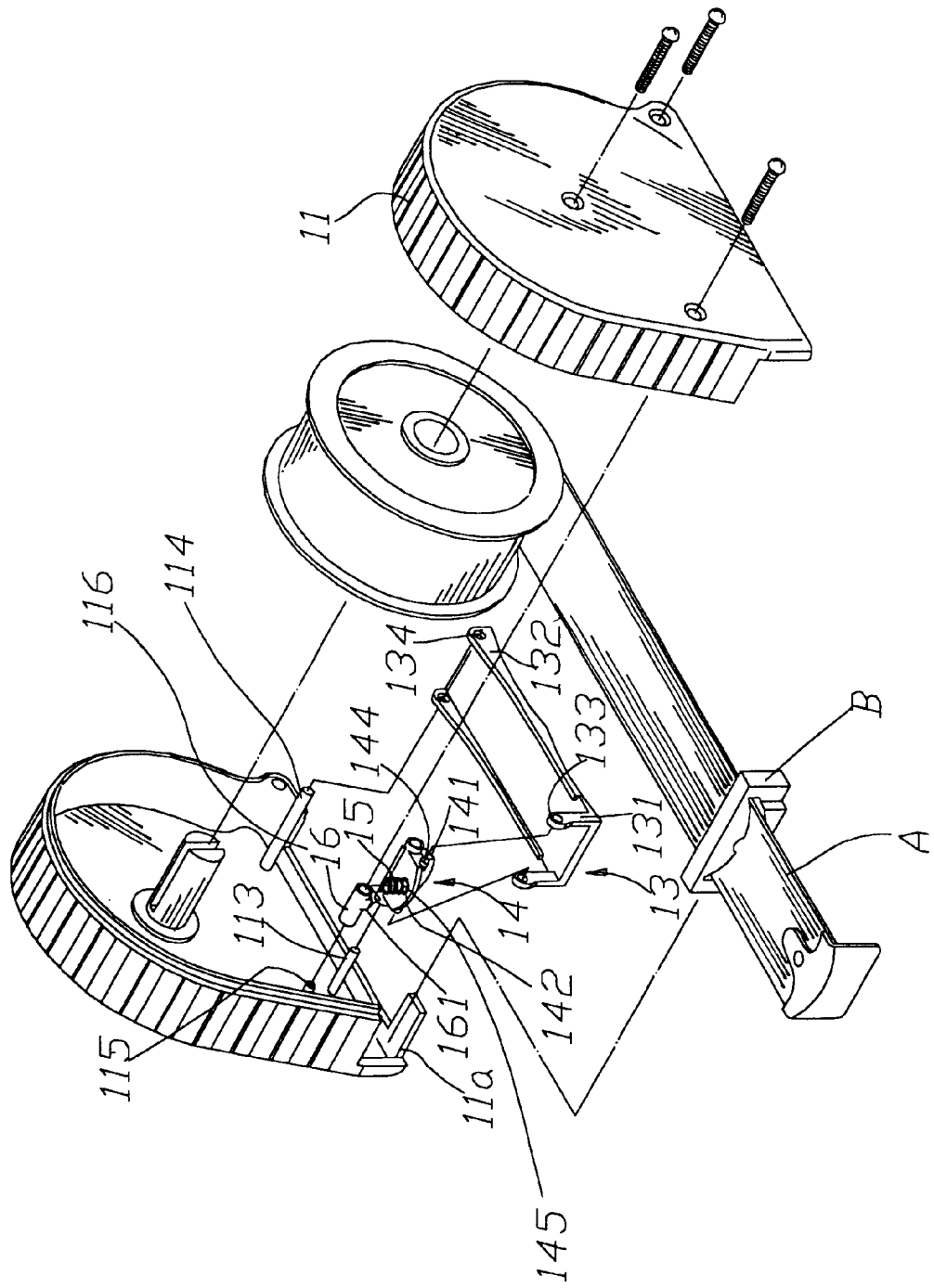
FIG. 3 is an exploded view of FIG. 2.
Figure 4:
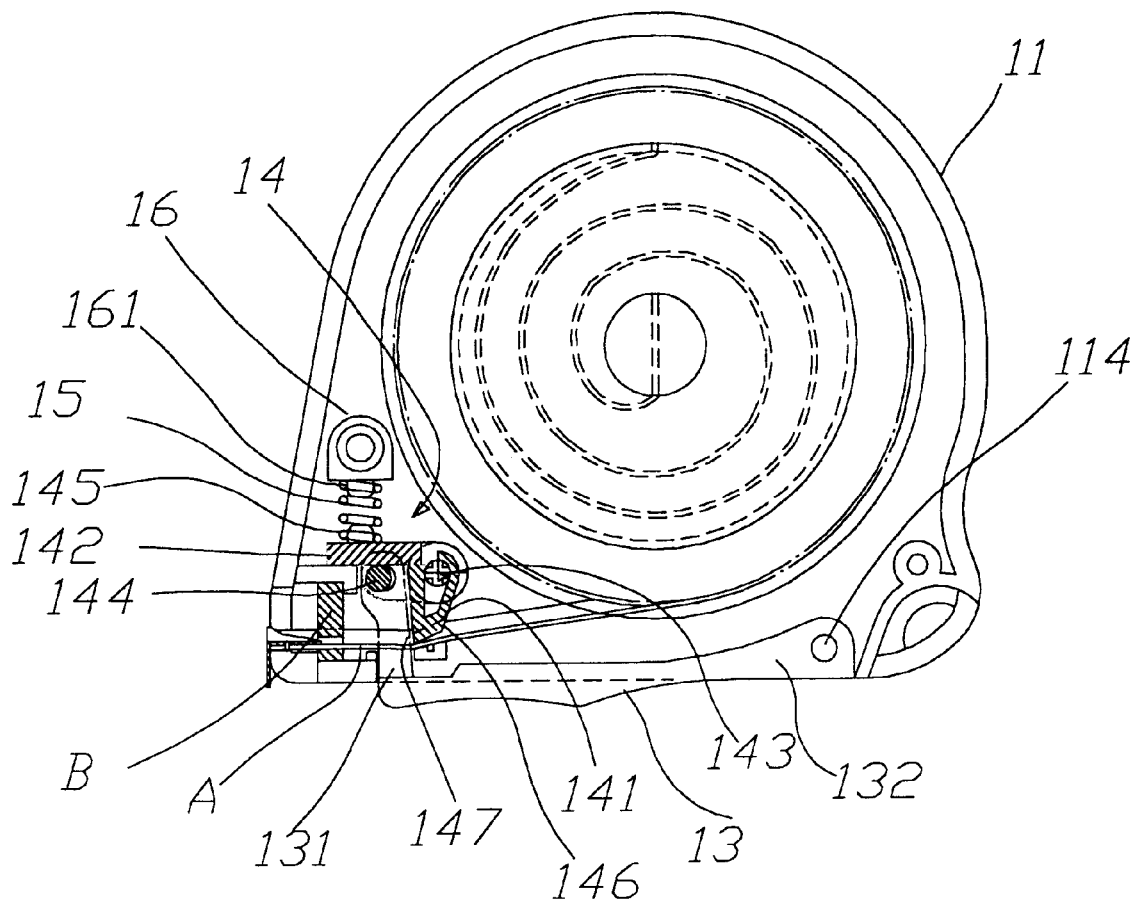
FIG. 4 is a cross-sectional view of the FIG. 2 tape measure.

Referring to FIGS. 2 to 4, there is shown a tape measure constructed in accordance with the invention. The lock mechanism of the tape measure is detailed below. An opening 116 is formed at the bottom of case 11. Three pins 113, 114, and 115 are provided within the case 11 wherein first and third pins, 113 and 115 are provided near opening 11a and second pin 114 is provided at the distal end of opening 11a. A substantially rectangular shaped tape lock 13 is provided at the opening 116 and comprises a pair of rear holes 134 with the second pin 114 passed therethrough and a pair of front holes 133 with opposite studs 144 on the planar member 142 of engagement device 14 received therein. The engagement device 14 further comprises a hole 143 in the rear of the planar member 142 with the first pin 113 passed therethrough, an engagement member 141 extended down from the hole 143, and a post 145 on the planar member 142 with spring 15 positioned thereon. An abutment device 16 is positioned on third pin 115 above the planar member 142 and comprises an abutment member 161 at the bottom thereof engaged with a spring 15 for anchoring the spring 15 between the planar member 142 and the abutment member 161. A rearward upward slope 146 is formed on the engagement member 141. A contact 147 is provided at the bottom of the engagement member 141.

As shown in FIG. 3, the tape lock 13 includes a pair of front corner projections 131 each including one of the front holes 133, and a pair of rear corner projections 132 each including one of the rear holes 134, such that tape A is slid between the front corner projections 131.

Figure 6:
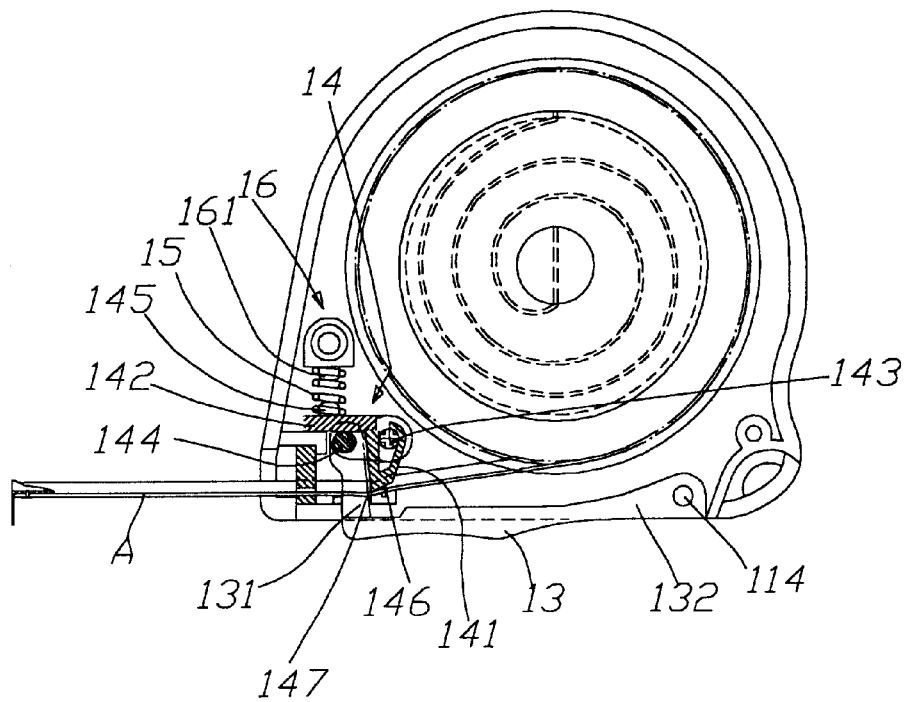
FIG. 6 is a view similar to FIG. 4 where the tape lock being released.
Figure 5:
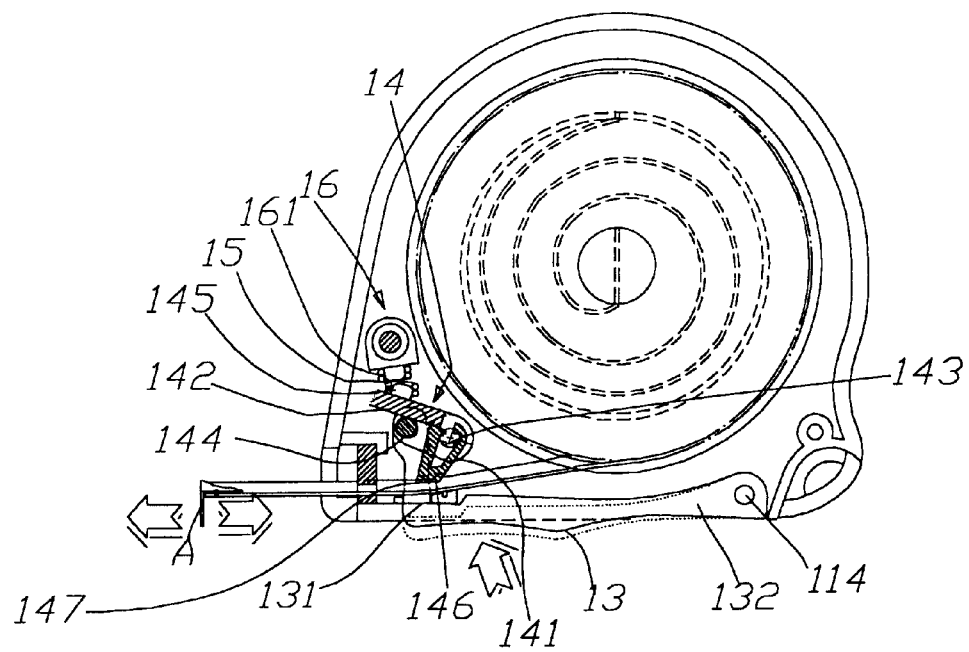
FIG. 5 is a view similar to FIG. 4 for illustrating the pulling and the rewinding operations of the FIG. 2 tape measure by pressing the tape lock.

Referring to FIGS. 5 and 6, an operation of the lock mechanism of tape measure will now be described. In pulling or rewinding tape A simply press the front end of the tape lock 13 to cause the tape lock 13 to pivot upwards about the second pin 114 to cause the engagement device 14 to pivot upwards about the first pin 113 (FIG. 5). At this time, the spring 15 is compressed and the engagement member 141 becomes disengaged from tape A, thus allowing tape A to pull or rewind freely. To lock the tape, the user may release the tape lock 13 to cause both the tape lock 13 and the engagement device 14 to pivot in a reverse direction by the expansion of the spring 15 until the contact member 147 is biased against the tape lock 13 for locking tape A (see FIG. 6). Note that the locking/unlocking of tape A is effected in an up-and-down movement of the front end of tape lock 13 as opposed to the transverse movement of prior art.

While the invention has been described by means of specific embodiments, numerous modifications and variations could be made thereto by those skilled in the art without departing from the scope and spirit of the invention set forth in the claims.

What is claimed is:

1. A tape measure comprising:

a case including a predetermined length of tape, a front tape opening, a bottom opening, first, and third pins positioned on an inner surface of the case proximate to the front tape opening, and a second pin positioned on the inner surface distally from the front tape opening;

lock device at the bottom opening, the device including a pair of rear holes with the second pin passed therethrough and a pair of front holes;

an engagement device including a planar member, an aperture in a rear of the planar member with the first pin passed therethrough, an engagement member extended down from the aperture, a post positioned on the planar member, and two studs on the opposite sides of the planar member received in the font holes of the lock device;

an abutment device, positioned on the third pin above the planar member, the abutment device including an abutment member at a bottom thereof;

and a spring positioned on the post for engaging the abutment member.

2. The tape measure as claimed in claim 1, wherein the engagement member comprises a rearward and upward slope and a contact member at a bottom thereof.

3. The tape measure as claimed in claim 2, wherein a curvature of the contact member is substantially the same as that of the tape.

* * * * *